(12) United States Patent
Sylvain

(10) Patent No.: US 7,418,091 B1
(45) Date of Patent: Aug. 26, 2008

(54) SELECTIVE CALL WAITING CALLER ID

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 674 days.

(21) Appl. No.: 10/692,575

(22) Filed: Oct. 24, 2003

(51) Int. Cl.
*H04M 3/42* (2006.01)

(52) U.S. Cl. .............................. 379/215.01; 379/142.08

(58) Field of Classification Search ..............................
379/201.01–201.15, 142.08, 207.02, 210.02,
379/211.02, 213.01, 215.01
See application file for complete search history.

(56) References Cited

U.S. PATENT DOCUMENTS

| | | | |
|---|---|---|---|
| 4,782,508 A | 11/1988 | Borchering et al. ........... 379/67 |
| 5,033,076 A | 7/1991 | Jones et al. ................... 379/67 |
| 5,038,374 A | 8/1991 | Kaufman et al. .............. 379/98 |
| 5,161,181 A | 11/1992 | Zwick .......................... 379/67 |
| 5,263,084 A | 11/1993 | Chaput et al. ................ 379/215 |
| 5,341,414 A | 8/1994 | Popke ......................... 379/142 |
| 5,412,711 A | 5/1995 | Hayashi ....................... 379/67 |
| 5,497,414 A | 3/1996 | Bartholomew .............. 379/142 |
| 5,521,969 A | 5/1996 | Paulus et al. ................. 379/142 |
| 5,530,741 A | 6/1996 | Rubin ......................... 379/142 |
| 5,784,448 A * | 7/1998 | Yaker ..................... 379/215.01 |
| 5,974,133 A | 10/1999 | Fleischer, III et al. ........ 379/230 |
| 6,041,111 A | 3/2000 | Shelton ....................... 379/201 |
| 6,061,439 A | 5/2000 | Bleile et al. .................. 379/201 |
| 6,282,281 B1 | 8/2001 | Low ............................ 379/230 |
| 6,330,317 B1 | 12/2001 | Garfinkel .................... 379/196 |
| 6,415,026 B1 * | 7/2002 | Flood .................... 379/215.01 |
| 6,519,335 B1 * | 2/2003 | Bushnell ................ 379/215.01 |
| 6,553,110 B1 | 4/2003 | Peng ...................... 379/210.03 |
| 6,631,188 B1 * | 10/2003 | Sands .................... 379/215.01 |
| 6,738,467 B1 * | 5/2004 | Infosino ................ 379/215.01 |
| 6,813,347 B2 * | 11/2004 | Baals et al. ............ 379/215.01 |
| 2002/0141559 A1* | 10/2002 | Gurgun ................. 379/215.01 |
| 2007/0127660 A1* | 6/2007 | Roberts et al. .............. 379/161 |

* cited by examiner

*Primary Examiner*—William J Deane
(74) *Attorney, Agent, or Firm*—Withrow & Terranova, PLLC

(57) ABSTRACT

The present invention allows a user to establish a customized call waiting rule set to control whether call waiting alerts and associated caller identification information are provided to the user in association with an incoming call. Based on the call waiting rule set, the call waiting alert may be blocked or provided to the user when an incoming call for the user is detected. The decision to provide the call waiting alert may be based on the calling party, the type of call, the party with whom the user is engaged in an active call, whether the user previously called or received a call from the calling party, the relative priority or urgency of the incoming call, or a combination thereof.

33 Claims, 6 Drawing Sheets

SELECTIVE CALL WAITING CALLER ID

FIELD OF THE INVENTION

The present invention relates to caller identification associated with incoming calls, and in particular to allowing subscribers to establish rules for selectively providing call waiting and caller identification to users already engaged in a call.

BACKGROUND OF THE INVENTION

The provision of caller identification to called parties has proven to be very desirable to telephone subscribers. Caller identification is now available for incoming calls when the called party is not actively engaged in a call as well as when the called party is engaged in a call. When the called party of an incoming call is already actively engaged in a call, a call waiting alert, along with caller identification information, is provided to the called party over the voice channel. Many users find the call waiting alert very interruptive, especially since the user may have to remove the handset of the telephone terminal from her ear to view the caller identification information and assess the relative importance of the call. If the call waiting alert is ignored, the alert may repeat for several seconds to further the interruption.

Although the receipt of caller identification while engaged in a call is potentially beneficial, the interruptive nature of such receipt has lead to many users opting not to subscribe to the service. This loss of subscribers results in loss of revenue for service providers. Since most users would like to receive call waiting alerts for certain incoming calls and not for others, there is a need to allow users to control whether call waiting alerts are provided to them based on predefined criteria.

SUMMARY OF THE INVENTION

The present invention allows a user to establish a customized call waiting rule set to control whether call waiting alerts and associated caller identification information are provided to the user in association with an incoming call. Based on the configuration of the call waiting rule set, the call waiting alert may be blocked or provided to the user when an incoming call for the user is detected. The decision to provide the call waiting alert may be based on the calling party, the type of call, prior calls made or received, the party with whom the user is engaged in an active call, the relative priority or urgency of the incoming call, or a combination thereof. Those skilled in the art will recognize other criteria to use in defining the rule set. The call waiting rule set may be configured by the user in any number of ways, including via a computing device over a packet network or via a telephone using an interactive voice response system.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a user to establish rules, which will control whether caller identification (caller ID) information is provided to the user when the user is participating in a call. The rules will effectively control whether or not an incoming call results in a call waiting indication and the caller ID information being provided to the user. The determination to provide or block the call waiting indication and provide the caller ID information may be based on the caller's number, the type of call, such as long distance or international, the party with whom the user is currently engaged in a call, whether the user previously called or received a call from the calling party, time and date, and the relative urgency or priority assigned to the incoming call. Accordingly, the user can effectively customize how the call waiting service is provided, and minimize the interruptive potential of the call waiting service while retaining the benefit thereof.

Figure 1:
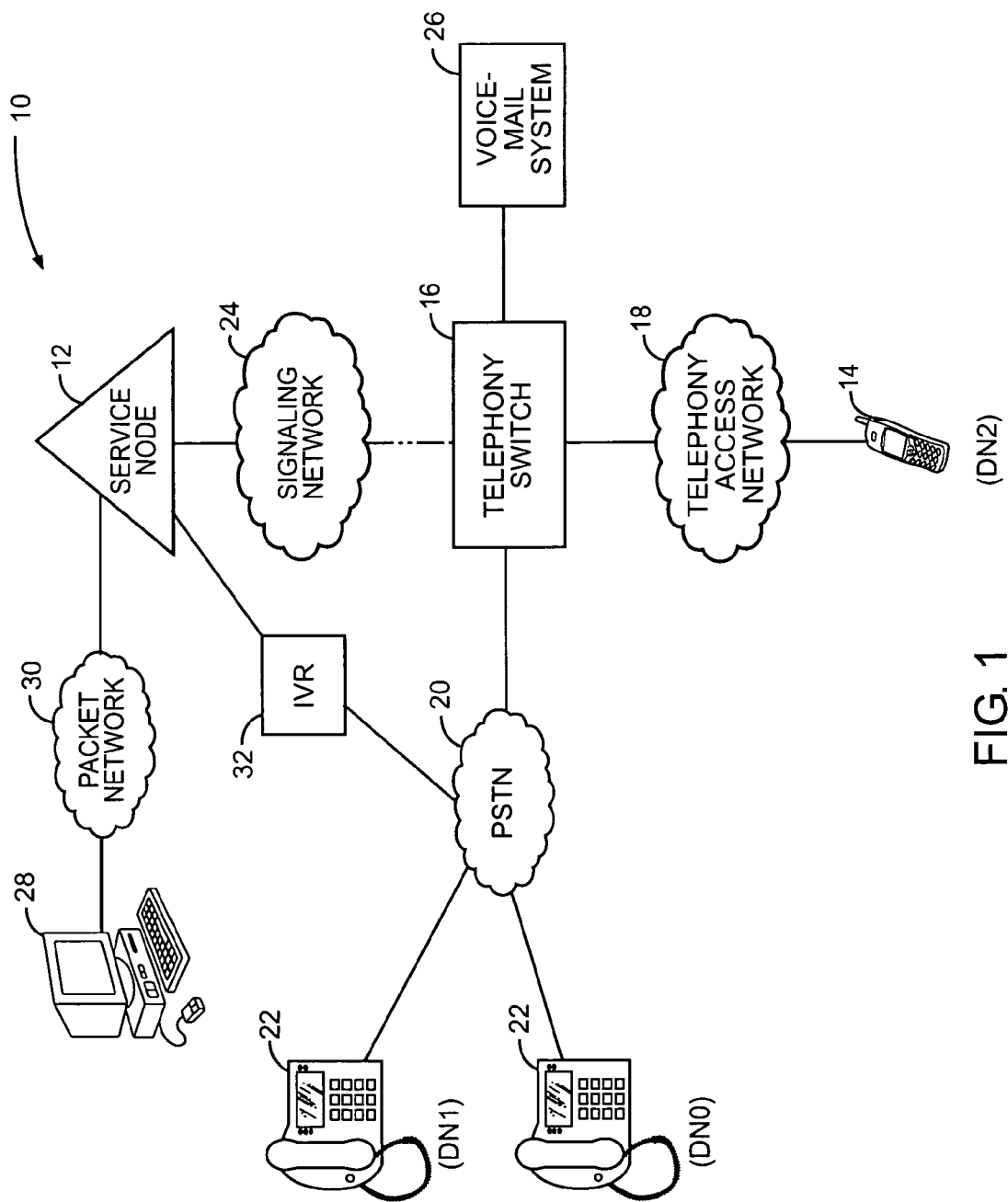
FIG. 1 is a block representation of a communication environment according to one embodiment of the present invention.

As illustrated in FIG. 1, a communication environment 10 capable of providing selective call waiting is provided. In general, a service node 12 is used to provide control over the delivery of call waiting indicia and the associated caller ID information for incoming calls to a user who is already engaged in a call. Assume the user is associated with a telephony terminal 14, which is supported by a telephony switch 16 via any type of wired or wireless telephony access network 18. Notably, the telephony access network 18 may be a simple telephony line connecting the telephony switch 16 and the telephony terminal 14, or may be a network of base stations in a cellular network, wherein the telephony switch 16 is a mobile switching center and the telephony terminal 14 is a mobile telephone. Further, the telephony terminal 14, telephony switch 16, and telephony access network 18 may be implemented in a circuit-switched or packet-based environment without veering from the concepts of the present invention.

In the illustrated embodiment, the telephony switch 16 is directly or indirectly coupled in an operative fashion to the Public Switched Telephone Network (PSTN) 20, which directly or indirectly provides service to third party telephony terminals 22. The service node 12 effectively communicates with the telephony switch 16 via a signaling network 24. In operation, the telephony switch 16 is configured to recognize when the telephony terminal 14 is engaged in a call when an incoming call is received, and initiate a call waiting service, wherein a call waiting alert signal as well as caller ID information associated with the incoming call are provided to the user via the telephony terminal 14. Instead of automatically providing the call waiting service for all incoming calls, the telephony switch 16 will recognize that the telephony terminal 14 has subscribed to selective call waiting, and as such, will access the service node 12 to determine whether or not the call waiting service should be provided, on a call-by-call basis.

The service node 12 will receive a message from the telephony switch 16 indicating that there is an incoming call intended for the telephony terminal 14, and that the telephony terminal 14 is already engaged in a call. Based on the customizable rule set, which is preferably established by the user of the telephony terminal 14, the service node 12 will instruct the telephony switch 16 to either allow the call waiting service to proceed or otherwise block the call waiting service. In the latter case, the calling party associated with the incoming call may receive a busy signal or may be forwarded to a voicemail system 26.

The user can access the service node 12 in any number of ways, including via a personal computer 28 over a packet network 30, such as the Internet, or through the telephony terminal 14 (or other telephony terminal) through an interactive voice response system (IVR) 32, which is capable of taking touchtone or voice commands and converting them into appropriate messages for configuring the service node 12. Preferably, the IVR 32 is capable of cooperating with the service node 12 to provide audible information and instruction to assist the user in configuring the corresponding call waiting rule set. Various types of information may be provided about the incoming call or the call in which the user is already engaged to the service node 12 from the telephony switch 16 to assist in determining how to handle the call waiting event. Alternatively, the service node functionality may be incorporated in the telephony switch 16.

Figure 2:
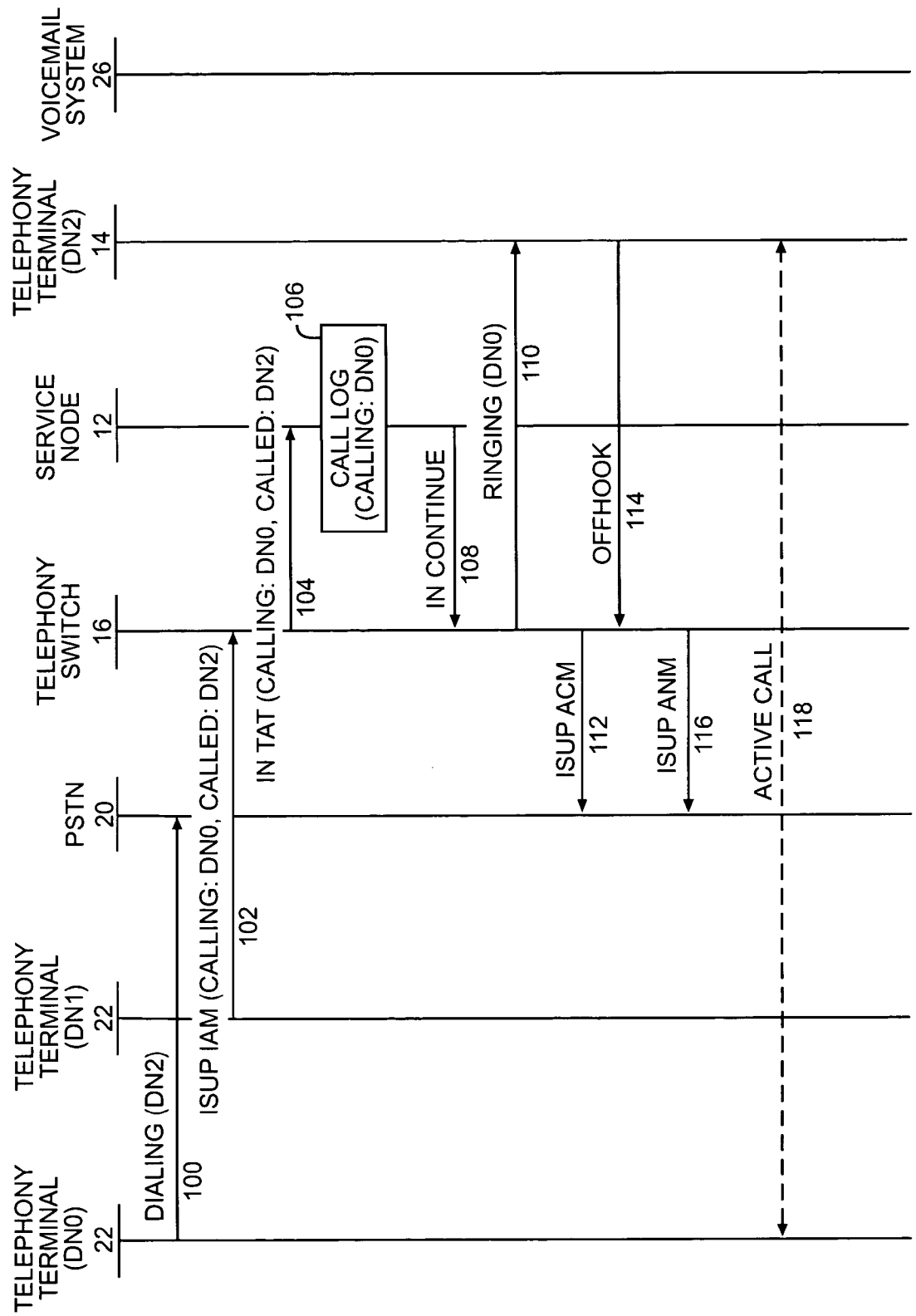
FIGS. 2-4 are flow diagrams illustrating various call waiting caller ID scenarios and the processing thereof according to preferred embodiments of the present invention.

With reference to FIG. 2, an exemplary call flow diagram is provided wherein a caller at the third party telephony terminal 22 associated with directly number DN0 initiates and establishes a call to the telephony terminal 14, which is associated with directory number DN2. For clarity of description, the two third party telephony terminals 22 illustrated in FIG. 1 will be referenced as telephony terminal DN0 and telephony terminal DN1, which is associated with directory number DN1. Initially, telephony terminal DN0 will initiate a call to telephony terminal DN2 (14) by dialing the directory number DN2 (step 100). The call is received by a telephony switch (not shown) in the PSTN 20, which will forward an Integrated Services User Protocol (ISUP) Initial Address Message (IAM) to telephony switch 16, which provides service for telephony terminal DN0 (14) (step 102). The ISUP IAM will include the directory number for the calling party (DN2) as well as that of the calling party (DN0). Telephony switch 16 may be provisioned to alert the service node 12 of incoming calls, and as such may send an Intelligent Network (IN) Termination Attempt Trigger (TAT) to the service node 12 to identify the calling and called parties using the directory numbers DN0 and DN2, respectively (step 104). The service node 12 will receive the IN TAT and store the identification of the calling party (DN0) in a call log for the user (step 106). After logging the incoming call, the service node 12 will instruct the telephony switch 16 to continue processing the call by sending an IN Continue message to telephony switch 16 (step 108). In response, telephony switch 16 will initiate the ringing of telephony terminal DN2 (14) and perhaps provide caller identification (DN0) in traditional fashion (step 110). In the meantime, telephony switch 16 will send an ISUP Address Complete Message (ACM) back through the PSTN 20 (step 112), which will alert the servicing switch (not shown) of the telephony terminal DN0 that telephony terminal DN2 (14) is ringing and waiting to be answered.

Once telephony terminal DN2 (14) is answered, telephony switch 16 will receive an Offhook message or like indicia indicating that telephony terminal DN0 has been answered (step 114) and will provide an ISUP Answer Message (ANM) back through the PSTN 20 to the servicing telephony switch (not shown) for telephony terminal DN0 (step 116). At this point, an active call is established between telephony terminal DN0 and telephony terminal DN2 (14) (step 118). Notably, the service node 12 may be alerted that telephony terminal DN2 (14) is participating in a call when a call is originated from telephony terminal DN2 (14), and not just when the call is terminated or otherwise intended for telephony terminal DN2 (14).

Figure 3A:
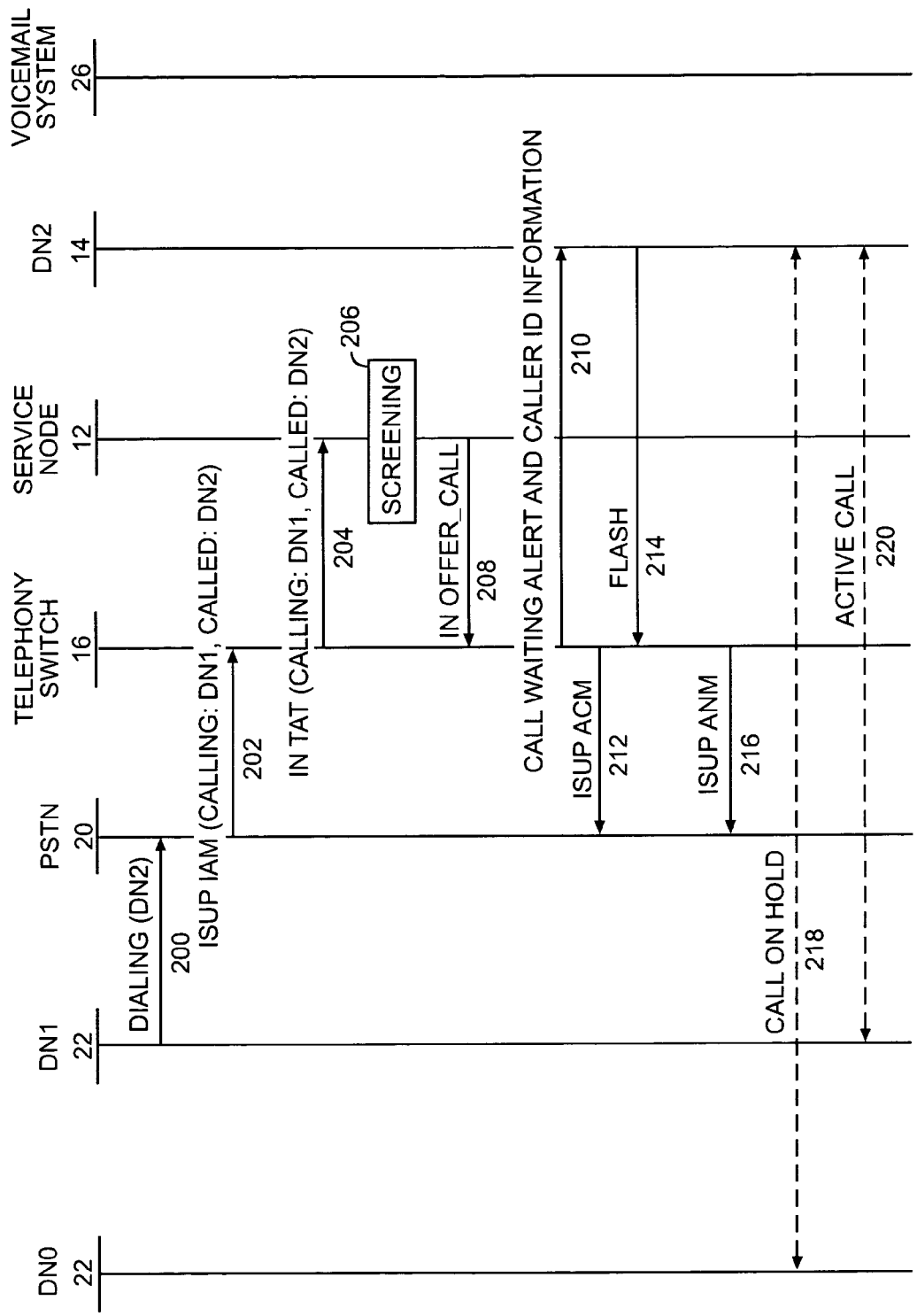

Turning now to FIG. 3A, assume there is an active call between telephony terminal DN0 and telephony terminal DN2 (14), and that telephony terminal DN1 initiates a call to telephony terminal DN2 (14). As such, telephony terminal DN1 will dial a directory number, DN2, of telephony terminal DN2 (14), which is processed by the PSTN 20 (step 200). This results in an ISUP IAM identifying the calling and called parties using directory numbers DN1 and DN2, respectively, being sent to the telephony switch 16 (step 202), which will send an IN TAT identifying the calling and called parties to the service node 12 (step 204). Either from information included in the IN TAT or by checking the call log for telephony terminal DN2 (14), the service node 12 will recognize that telephony terminal DN2 (14) is participating in an active call and has subscribed to a selective call waiting service. The service node 12 will access the call waiting rule set for telephony terminal DN2 (14), and based on the call waiting rule set, screen the call by determining whether to instruct telephony switch 16 to proceed with providing the call waiting alert and associated caller ID information or to block the call waiting service (step 206).

In this example, assume that the service node 12 determines that the call waiting alert and associated caller ID information should be provided to telephony terminal DN2 (14), and as such, sends an IN Offer Call message (or alternatively a Continue message) to the telephony switch 16 (step 208), which will then take the necessary steps to provide the call waiting alert and caller ID information (DN1) to telephony terminal DN2 (14) (step 210). In the meantime, telephony switch 16 will send an ISUP ACM back through the PSTN 20 to the servicing telephony switch (not shown) for telephony terminal DN1 (step 212). Assuming the user of telephony terminal DN2 (14) reviews the provided caller ID information in response to the call waiting alert and decides to answer the incoming call, the user will initiate a Flash hook signal by pressing the send button or toggling the telephone on and back off hook. The Flash hook signal is received by telephony switch 16 (step 214), which will send an ISUP ANM back through the PSTN 20 to the servicing telephony switch (not shown) of telephony terminal DN1 (step 216). At this point, the originally active call between telephony terminal DN0 and telephony terminal DN2 is placed on hold (step 218) and an active call is established between telephony terminal DN1 and telephony terminal DN2 (step 220).

Figure 3B:
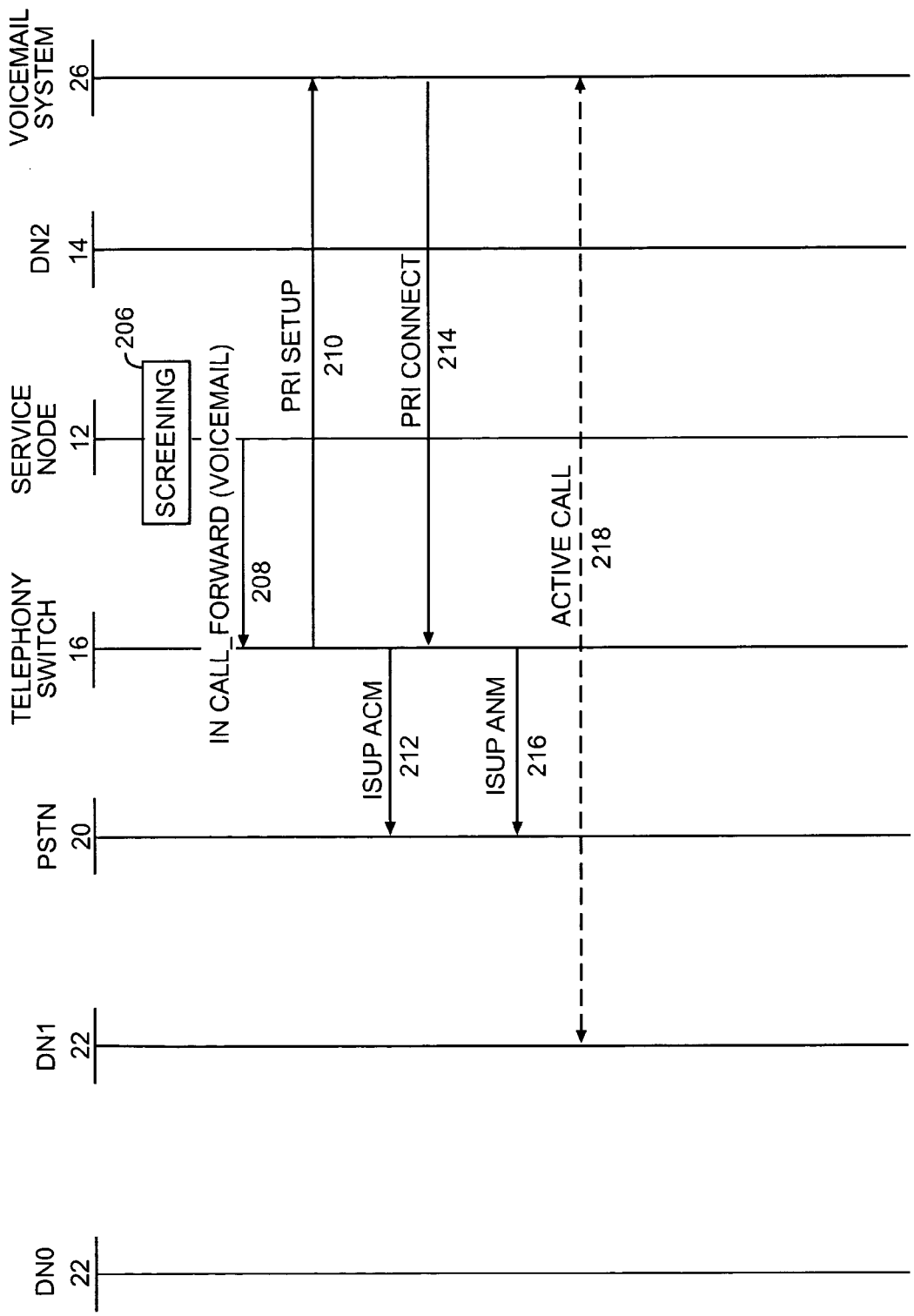

With reference to FIG. 3B, assume that the call waiting rule set and any pertinent information to apply to the rule set dictates that the service node 12 instruct the telephony switch 16 not to provide the call waiting alert. In this instance, during the screening in response to detecting an incoming call (step 206), the service node 12 may instruct the telephony switch 16 to forward the incoming call to the voicemail system 26 using an IN Call Forward message (step 208). The telephony switch 16 may initiate forwarding of the incoming call to the voicemail system 26 by sending a Primary Rate Interface (PRI) Setup message to the voicemail system 26 (step 210), as well as sending an ISUP ACM back through the PSTN 20 toward the servicing telephony switch (not shown) for telephony terminal DN1 (step 212). When the voicemail system 26 answers the PRI Setup message, a PRI Connect message is sent back to telephony switch 16 (step 214), which will forward an ISUP ANM to the servicing telephony switch (not shown) for telephony terminal DN1 via the PSTN 20 (step 216). At this point, an active call is established between telephony terminal DN1 and the voicemail system 26 (step 218), wherein the caller may leave the user a voicemail message in traditional fashion.

Figure 4:
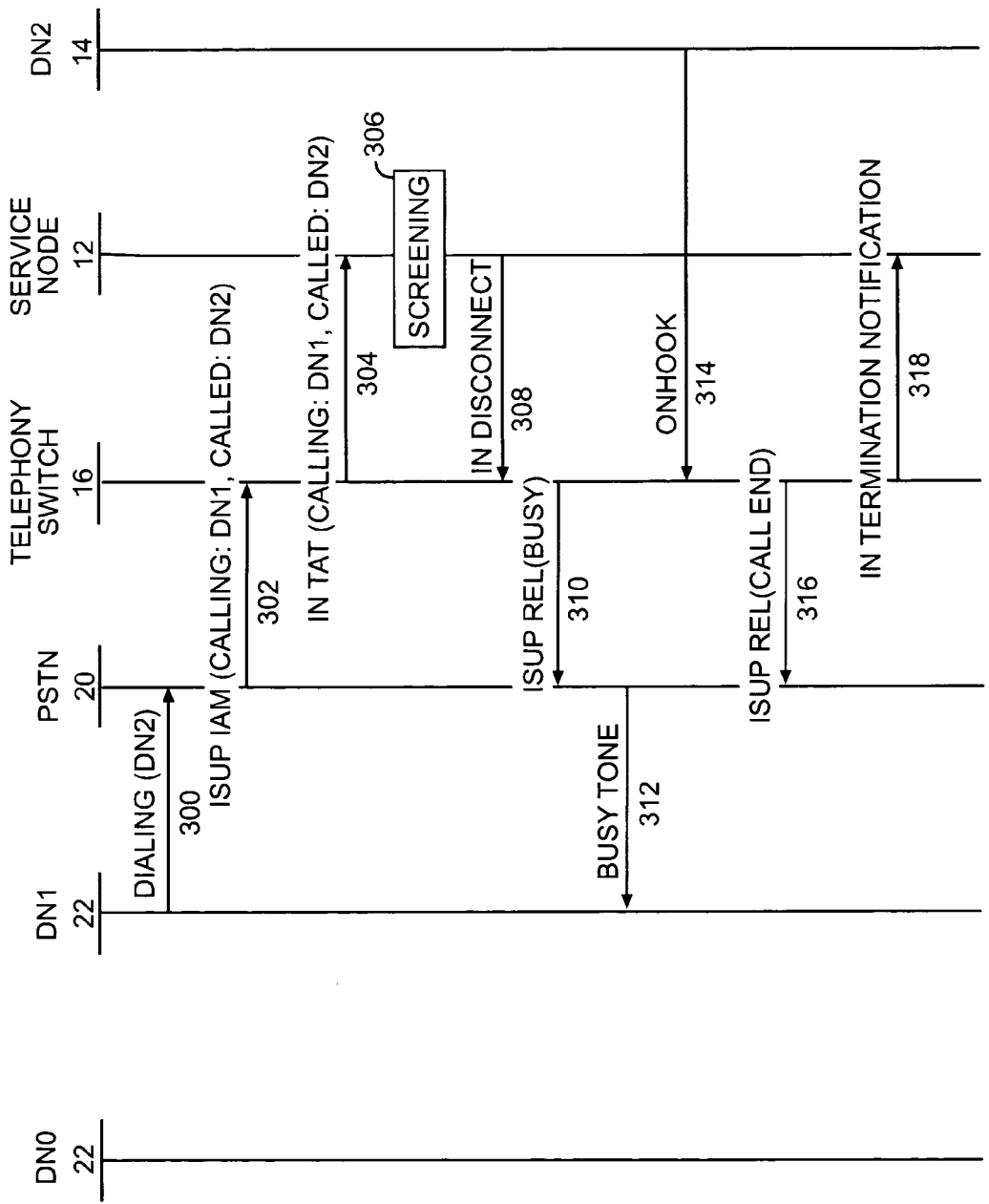

With reference to FIG. 4, a calling scenario is provided wherein the service node 12 determines not to provide a call waiting alert and caller ID information, and is also notified when telephony terminal DN2 (14) is no longer engaged in a call. Assume that the active call established in FIG. 2 remains active, and a call to telephony terminal DN2 (14) is initiated by telephony terminal DN1 dialing directory number DN2 (step 300). The servicing telephony switch (not shown) for telephony terminal DN1 will receive the dialed digits and send an ISUP IAM to telephony switch 16 identifying the calling and called parties (step 302). Telephony switch 16 will recognize that the incoming call is intended for telephony terminal DN2 (14) and send an IN TAT to the service node 12 identifying the calling and called parties with the directory numbers DN1 and DN2, respectively (step 304). The service node 12 will provide the requisite screening using the call waiting rule set (step 306). In this instance, the service node 12 determines that the call waiting alert and associated caller ID information should not be sent to telephony terminal DN2 (14) and will send an IN Disconnect message to the telephony switch 16 (step 308). In this example, assume the voicemail system 26 is not available. In response to the IN Disconnect message, the telephony switch 16 will send an ISUP Release or Busy message back through the PSTN 20 (step 310), which will result in a busy tone being provided to telephony terminal DN1 (step 312).

At some point in time, telephony terminal DN2 (14) will end the active call by going onhook. Telephony switch 16 will sense the onhook or end of call condition (step 314) and send an ISUP Release or Call End message through the PSTN 20 toward the servicing telephony switch (not shown) for telephony terminal DN1 (step 316). Telephony switch 16 may also send an IN Termination Notification to the service node 12 indicating that telephony terminal DN2 (14) is no longer engaged in an active call (step 318). At this point, the service node 12 will update the call log and prepare itself for handling new incoming calls to telephony terminal DN2 (14).

The call waiting rule set may be based on a variety of information. For example, the call waiting rule set may allow the provisioning or otherwise block the call waiting service based on the calling party, the type of telephone call, such as long distance or international calls, the party with whom the user is actively engaged in a call, whether the user previously called or received a call from the calling party, the time and date, or the ascertainable urgency or priority of the call. Those skilled in the art will recognize other criteria on which the call waiting rule set may be based. Notably, the rule set may be based on any of these criteria alone or in combination, and preferably as customized by the user.

Figure 5:
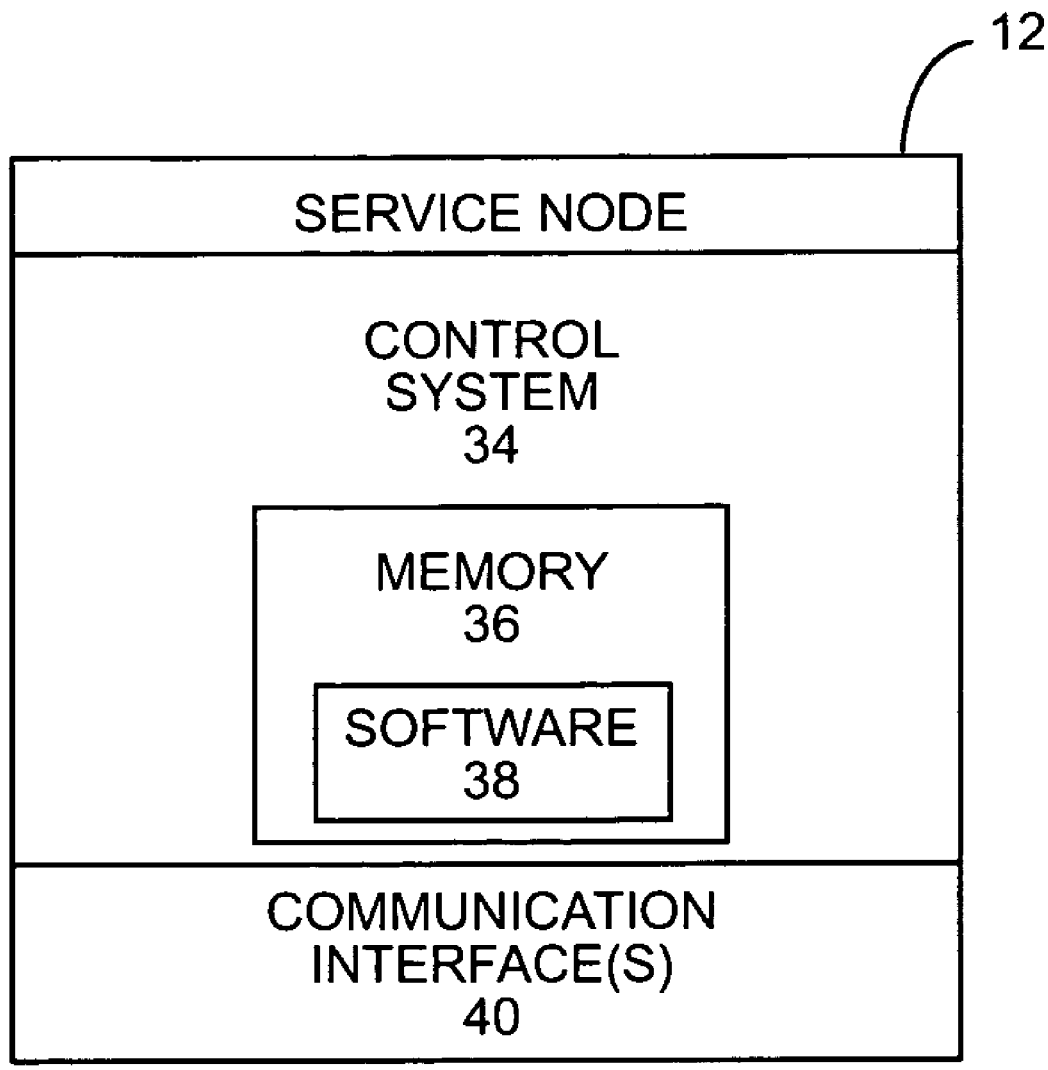
FIG. 5 is a service node configured according to one embodiment of the present invention.

With reference to FIG. 5, a block representation of a service node 12 is provided as having a control system 34 with sufficient memory 36 for the necessary software 38 to provide the above functionality. The control system 34 is also associated with one or more communication interfaces 40 to facilitate communications with the telephony switch 16, IVR 32, or PC 28 via the respective network or communication requirements.

Those skilled in the art will recognize improvements and modifications to the preferred embodiments of the present invention. All such improvements and modifications are considered within the scope of the concepts disclosed herein and the claims that follow.

What is claimed is:

1. A method for selectively controlling the provision of a call waiting alert in response to an incoming call when a user is participating in an active call, comprising:
   a. receiving from a telephony switch an incoming call indication indicative of an incoming call intended for a user's telephone terminal;
   b. determining whether to provide a call waiting alert to the user's telephone terminal based on a call waiting rule set, which is customized for the user; and
   c. providing an instruction instructing the telephony switch whether to provide the call waiting alert to the user's telephone terminal.

2. The method of claim 1 further comprising receiving information indicating the user is engaged in the active call.

3. The method of claim 2 further comprising receiving identifying information identifying a party with whom the user is engaged in the active call.

4. The method of claim 1 further comprising receiving information indicating that the user is no longer participating in the active call.

5. The method of claim 1 wherein the instruction is adapted to instruct the telephony switch to provide the call waiting alert.

6. The method of claim 1 wherein the instruction is adapted to instruct the telephony switch to forward the incoming call to a voicemail system for the user.

7. The method of claim 1 wherein the instruction is adapted to instruct the telephony switch to send a busy signal to a caller initiating the incoming call.

8. The method of claim 1 further comprising receiving customizing information from the user to customize the call waiting rule set for the user.

9. The method of claim 8 wherein the customizing information is received from a computing device via a packet network.

10. The method of claim 8 wherein the customizing information is received from a telephony terminal via an interactive voice response system.

11. The method of claim 1 wherein the call waiting rule set is customized such that providing the call waiting alert is based at least in part on information identifying a caller initiating the incoming call.

12. The method of claim 1 wherein the call waiting rule set is customized such that providing the call waiting alert is based at least in part on a type of call associated with the incoming call.

13. The method of claim 1 wherein the call waiting rule set is customized such that providing the call waiting alert is based at least in part on a party with whom the user is engaged in the active call.

14. The method of claim 1 wherein the call waiting rule set is customized such that providing the call waiting alert is based at least in part on a time, date, or combination thereof associated with the incoming call.

15. The method of claim 1 wherein the call waiting rule set is customized such that providing the call waiting alert is based at least in part on a relative priority or urgency associated with the incoming call.

16. The method of claim 1 wherein the call waiting rule set is customized such that providing the call waiting alert is based at least in part on previously called parties.

17. The method of claim 1 wherein the call waiting rule set is customized such that providing the call waiting alert is based at least in part on previous callers.

18. A system for selectively controlling the provision of a call waiting alert in response to an incoming call when a user is participating in an active call comprising:
 a. a communication interface; and
 b. a control system operatively associated with the communication interface and adapted to:
  i. receive from a telephony switch an incoming call indication indicative of an incoming call intended for a user's telephone terminal;
  ii. determine whether to provide a call waiting alert to the user's telephone terminal based on a call waiting rule set, which is customized for the user; and
  iii. provide an instruction instructing the telephony switch whether to provide the call waiting alert to the user's telephone terminal.

19. The system of claim 18 wherein the control system is further adapted to receive information indicating the user is engaged in the active call.

20. The system of claim 19 wherein the control system is further adapted to receive information identifying a party with whom the user is engaged in the active call.

21. The system of claim 18 wherein the control system is further adapted to receive information indicating that the user is no longer participating in the active call.

22. The system of claim 18 wherein the instruction is adapted to instruct the telephony switch to provide the call waiting alert.

23. The system of claim 18 wherein the instruction is adapted to instruct the telephony switch to forward the incoming call to a voicemail system for the user.

24. The system of claim 18 wherein the control system is further adapted to receive customizing information from the user to customize the call waiting rule set for the user.

25. The system of claim 24 wherein the customizing information is received from a computing device via a packet network.

26. The system of claim 24 wherein the customizing information is received from a telephony terminal via an interactive voice response system.

27. The system of claim 18 wherein the call waiting rule set is customized such that providing the call waiting alert is based at least in part on information identifying a caller initiating the incoming call.

28. The system of claim 18 wherein the call waiting rule set is customized such that providing the call waiting alert is based at least in part on a type of call associated with the incoming call.

29. The system of claim 18 wherein the call waiting rule set is customized such that providing the call waiting alert is based at least in part on a party with whom the user is engaged in the active call.

30. The system of claim 18 wherein the call waiting rule set is customized such that providing the call waiting alert is based at least in part on previously called parties.

31. The system of claim 18 wherein the call waiting rule set is customized such that providing the call waiting alert is based at least in part on previous callers.

32. The system of claim 18 wherein the call waiting rule set is customized such that providing the call waiting alert is based at least in part on a time, date, or combination thereof associated with the incoming call.

33. The system of claim 18 wherein the call waiting rule set is customized such that providing the call waiting alert is based at least in part on a relative priority or urgency associated with the incoming call.

* * * * *